UNITED STATES PATENT OFFICE.

LOUIS GREISER, OF BERLIN, GERMANY.

PROCESS OF PURIFYING COCOA.

1,004,870. Specification of Letters Patent. Patented Oct. 3, 1911.

No Drawing. Application filed November 3, 1909. Serial No. 526,011.

*To all whom it may concern:*

Be it known that I, LOUIS GREISER, residing at Berlin, Kingdom of Prussia, Germany, have invented certain new and useful Improvements in Processes for the Purification of Cocoa; and I do hereby declare the following to be a full, clear, and exact description of the invention, such as will enable others skilled in the art to which it appertains to make and use the same.

Processes for the purification of cocoa hitherto used, that is to say for removing natural moisture and the volatile substances which, if they be allowed to remain in the cocoa, considerably affect its flavor, consisted in the cocoa beans being taken whole or broken to small pieces, and in that state subjected to a roasting process with the admission of fresh air. During that roasting it was however possible to insure uniform treatment of the single pieces of cocoa.

This invention relates to a process which produces a thoroughly uniform purification, in which it is impossible that some portions of the cocoa should have properties different from the rest, and the process moreover guarantees a more thorough purifying action. According to the new process finely ground cocoa mass, mixed with sugar if desired, is boiled in a closed vessel in a vacuum. The mass is heated to a temperature of from 70° to 80° C., and at this temperature ebullition takes place and bubbles are formed, similar to the bubbles formed when water is boiled. This boiling expels the water and the volatile ingredients from the mass without overheating it. The said boiling is continued until the samples obtained show sufficient degree of purification. The duration of the boiling depends therefore on the kind, that is to say, on the quality of the cocoa, and on the previous roasting. The raw beans may be partially roasted before being treated by this process, or the roasting step may be omitted altogether.

In the vessel the cocoa mass behaves like a boiling liquid, in which of course the heat is distributed in a thoroughly uniform manner throughout the whole mass down to the smallest particles, so that the heating action is a more thorough one than is the case in the roasting process hitherto followed. Not only the moisture contained in the cocoa, but all volatile substances of the raw bean, or of the partially roasted bean, which unfavorably affect the flavor are removed, that is to say also the volatile chemical admixtures which are used for opening up and fermenting or circulation, but which, unless completely removed, give a bad taste to the cocoa after a certain length of keeping, are thoroughly removed down to the last traces. After the treatment in question, the cocoa mass is converted into chocolate or into cocoa powder without oil. It is however advantageous, not only to boil the pure cocoa mass in a vacuum, but also to treat the mass once more in the same way after adding sugar to it. As, owing to the addition of sugar to the purified mass, more moisture is added to it, it is advantageous to remove the said moisture again in the manner described, this having a further advantage that sugar enters into a more thorough connection with the cocoa mass, that is to say is melted together with it.

What I claim is:

A process for purifying cocoa, which consists in first grinding the cocoa beans at atmospheric pressure to form a pulp, and subsequently heating the pulp in a vacuum pan to a temperature at which ebullition takes place until the moisture and deleterious volatile ingredients have been expelled.

In testimony whereof I affix my signature, in presence of two witnesses.

LOUIS GREISER.

Witnesses:
 WOLDEMAR HAUPT,
 HENRY HASPER.